United States Patent [19] [11] Patent Number: 4,593,358
Takeshima et al. [45] Date of Patent: Jun. 3, 1986

[54] METHOD AND APPARATUS FOR CONTROLLING POWER STEERING

[75] Inventors: Sadao Takeshima; Takeshi Ohe, both of Higashimatsuyama, Japan

[73] Assignee: Jidosha Kiki Co., Ltd., Toyko, Japan

[21] Appl. No.: 536,918

[22] Filed: Sep. 27, 1983

[30] Foreign Application Priority Data

Sep. 30, 1982 [JP] Japan ................. 57-172387

[51] Int. Cl.$^4$ ............... B62D 5/04; B62D 5/06; G05D 13/02
[52] U.S. Cl. .................. 364/424; 180/142; 180/141; 74/388 PS
[58] Field of Search ............. 180/142, 143, 140, 141, 180/131, 132, 139, 79.1; 60/445, 446, 441; 74/388 PS; 364/424, 425

[56] References Cited

U.S. PATENT DOCUMENTS 3,171,298  3/1965  Henry-Biabaud .............. 74/495
3,744,587  7/1973  Schimkat et al. ............. 180/142
3,866,706  2/1975  Lincke et al. ............... 180/142
4,457,390  7/1984  Abe et al. .................. 180/142
4,473,128  9/1984  Nakayama et al. ............. 180/142

Primary Examiner—Felix D. Gruber
Assistant Examiner—Thomas G. Black
Attorney, Agent, or Firm—Townsend & Townsend

[57] ABSTRACT

Power steering control apparatus utilizing on oil pump comprises a car speed sensor producing a car speed signal, a steering sensor producing a steering signal, a mean car speed calculating circuit, a mean steering quantity calculating circuit, a mean lateral acceleration calculating circuit calculating a mean lateral acceleration based on the mean car speed and the mean steering quantity, a car speed calculating circuit, pattern memory means storing a plurality of number of revolutions characteristics of the oil pump corresponding to different patterns, a selector selecting one of the number of revolutions characteristics in accordance with the mean lateral acceleration and the mean car speed, circuit means for deriving out a number of revolutions signal of the oil pump corresponding to the car speed, and control means controlling rotation of the oil pump in accordance with the derived out number of revolutions signal of the oil pump.

4 Claims, 11 Drawing Figures

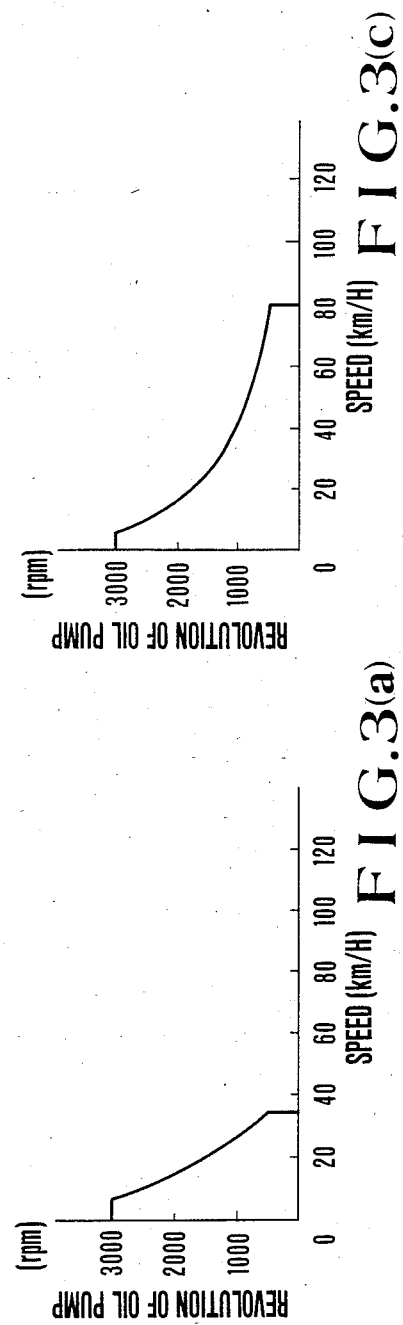
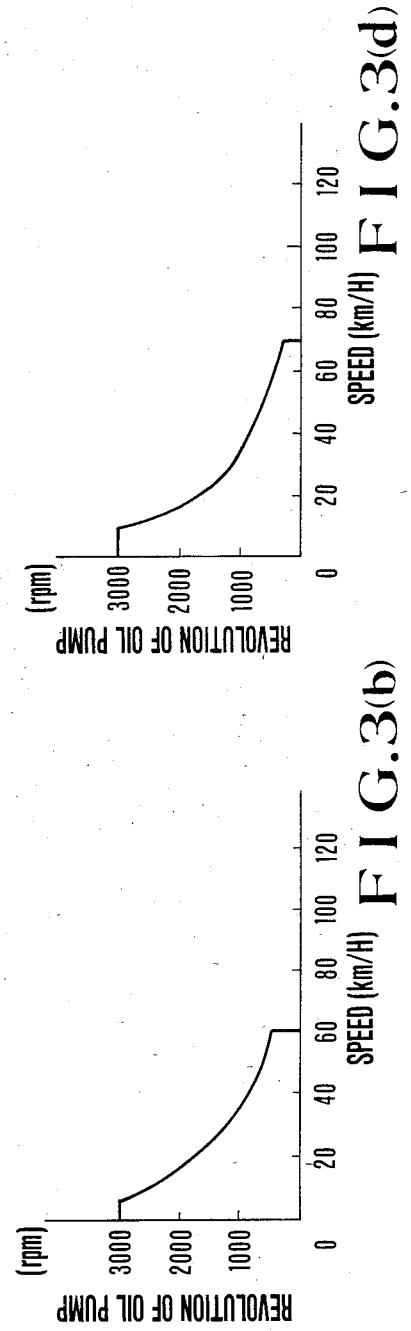

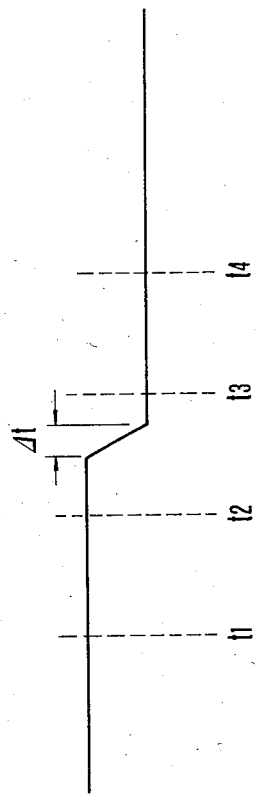

METHOD AND APPARATUS FOR CONTROLLING POWER STEERING

BACKGROUND OF THE INVENTION

This invention relates to a method and apparatus for controlling power steering.

Generally, the steering resistance of a motor car tends to increase as the car speed decreases so that when the steering resistance is cancelled by using a power steering device wherein oil is circulated by the operation of an oil pump, a satisfactory steering can be made with a small steering force even when the car speed is low. For this reason a power steering device has been used wherein the number of revolutions of the oil pump is increased when the car speed is low whereas as the car speed increases the number of revolutions of the oil pump is decreased, thereby enabling smooth steering. When the car speed increases to a predetermined speed above which power steering is not necessary the oil pump is stopped to save energy.

However on a downward path including many sharp curves, even when the car runs at a relatively high speed a large steering resistance is created. However, with the prior art power steering device utilizing a conventional control method and apparatus the oil pump stops when the car speed exceeds a predetermined value so that when the car runs down along a downward path including many sharp curves the power steering device would not operate thus requiring a large steering force. This difficulty can be obviated by increasing the car speed at which the oil pump stops, but with such measure, even when the car runs on a straight plane path the oil pump would stop thus consuming energy.

SUMMARY OF THE INVENTION

Accordingly, it is an object of this invention to provide a novel method and apparatus for controlling power steering capable of providing an optimum drive control commensurate with the running condition of a motor car while saving energy.

Another object of this invention is to provide a novel method and apparatus for controlling the power steering according to the best steering method for the running place of the car without giving any anxious feeling to the driver.

To accomplish these and other objects, according to this invention several types of the number of revolution characteristics of the oil pump representing the relations between the car speed and the number of revolutions of the oil pump are prepared by taking into consideration the number of revolution characteristic of the oil pump utilized in the power steering device, whereby the running state is judged based on a mean lateral acceleration and the car speed so as to select an optimum number of revolution characteristic of the oil pump.

According to one aspect of this invention there is provided a method of controlling a power steering apparatus wherein a number of revolutions of an oil pump is controlled to control power steering, characterized in that the method comprises the steps of calculating a mean car speed in a unit time in accordance with a car speed signal; calculating a mean steering quantity in the unit time in accordance with a steering signal representing a steering quantity; calculating a mean lateral acceleration based on the mean car speed and the mean steering quantity; preparing a plurality of types of number of revolution characteristics of the oil pump respectively showing a relation between a car speed and the number of revolutions of the oil pump when the car runs; selecting one of the plurality of number of revolution characteristics in accordance with the mean lateral acceleration and the mean car speed; and controlling the oil pump in accordance with the selected number of revolutions characteristic to cause the oil pump to rotate at a number of revolutions suitable for the car speed as the car runs.

According to another aspect of this invention there is provided power steering control apparatus characterized by comprising a car speed sensor producing a car speed signal; a steering sensor producing a steering signal representing a steering quantity of a steering wheel of a car; a mean car speed calculating circuit calculating a mean car speed based on the car speed signal; a mean steering quantity calculating circuit calculating a mean steering quantity based on the steering signal; a mean lateral acceleration calculating circuit calculating a mean lateral acceleration based on the mean car speed and the mean steering quantity thus calculated; a car speed calculating circuit calculating a car speed in accordance with the car speed signal; pattern memory means storing a plurality of number of revolution characteristics of the oil pump corresponding to different patterns showing relations between the car speed and the number of revolutions of the oil pump as the car runs; a selection circuit selecting one of the number of revolution characteristics in accordance with the mean lateral acceleration and the mean car speed; means for deriving out a number of revolutions signal of the oil pump corresponding to the car speed in accordance with the output of the car speed sensor; and control means controlling the rotation of the oil pump in accordance with the derived out number of revolutions signal of the oil pump.

BRIEF DESCRIPTION OF THE DRAWINGS

In the accompanying drawings:

FIGS. 3a–3d show number of revolution characteristics of the oil pump having different patterns for respective running conditions;

FIG. 8 is a timing chart showing the timings at steps shown in FIG. 7.

DESCRIPTION OF THE PREFERRED EMBODIMENTS

Figure 1:
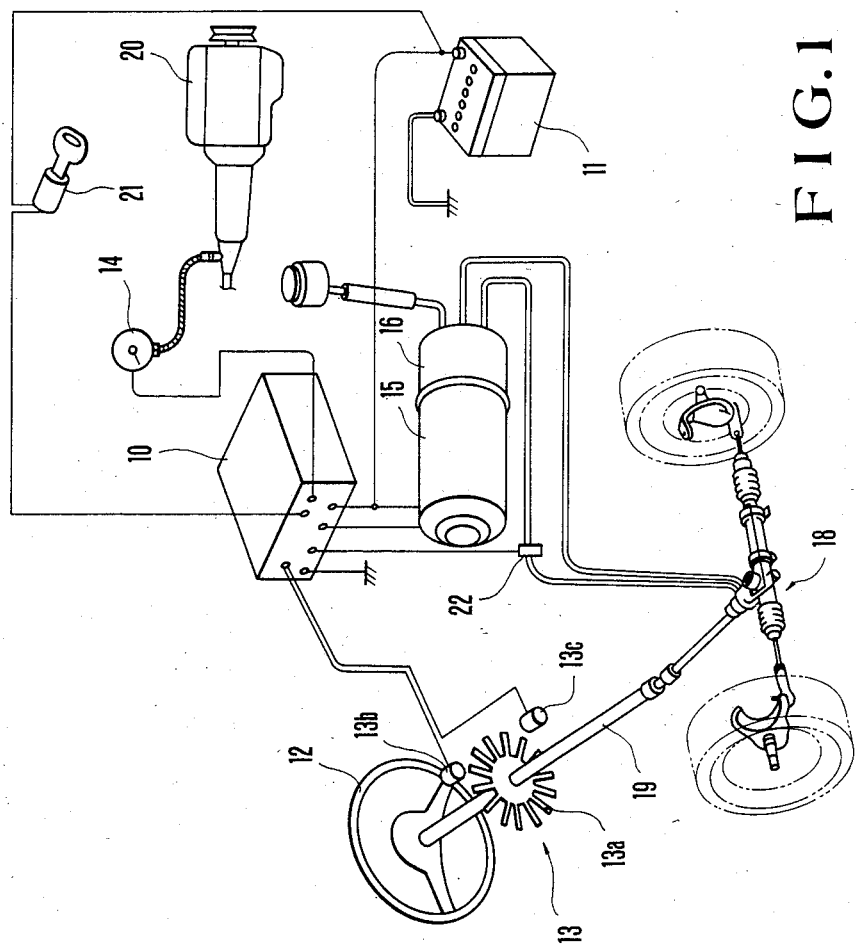
FIG. 1 is a diagrammatic representation showing the basic elements of a power steering device utilizing the power steering control apparatus embodying the invention.

The power steering control apparatus 10 embodying the invention and shown in FIG. 1 is connected to a battery 11 and connected to receive a steering signal representing the quantity or degree of rotation of a steering wheel 12 and generated by a steering sensor 13 and pulses sent out from a speed meter 14 as a car speed signal, at each unit running distance for executing a steering control processing to be described later in detail so as to adequately control the number of revolutions of an oil pump 16 driven by an electric motor 15, thus giving an auxiliary force for making smooth rotation of the steering wheel 18. In this example, the steering sensor 13 is mounted on a steering column 19 disposed between the steering wheel 12 and a power steering unit 18 connected to steering wheels. The steering sensor 13 comprises a circulate disc 13a having a plurality of radial slots on the peripheral portion and fixed to the steering column 19, a luminous diode 13b and a phototransistor 13c on the opposite sides of the disc 13a. Accordingly, when the steering wheel 12 is rotated, the steering column 19 is rotated so that the phototransistor 13c produces a signal corresponding to the angle of rotation of the steering wheel. In FIG. 1, reference numeral 20 desigantes an engine, particularly a diesel engine, 21 an ignition switch, 22 a load sensor connected in a pipe extending between the oil pump 16 and the steering unit 18 for producing a load state under which the power steering is performed, as the change in the oil pressure.

With this construction, the control apparatus 10 judges the present running condition of the car in accordance with the steering signal supplied from the steering sensor 13, and the load signal supplied from the load sensor 22, that is whether the car is running in a city area, plane load or mountain road so as to cause the oil pump 16 to rotate at an optimum number of revolution most suitable for the car speed at that time.

The operation of the control apparatus 10 will now be described with reference to the flow chart shown in FIG. 2.

Thus, at step A the car speed signal and the steering signal are taken in and stored in a memory device in the control apparatus. These two signals are taken in because at the succeeding steps C and D these two signals are necessary at the same time.

At step B a judgement is made as to whether the car is running or not by using the car signal taken in at step A. When the result of judgement executed at step B is YES, that is when the car is judged in the running state, at step C the mean car speed is calculated, and then at step D a mean steering quantity or angle is calculated. These mean car speed and the mean steering quantity are obtained by measuring variations in the car speed signal and the steering signal in a unit time. Then at step E a mean lateral acceleration is calculated by multiplying the mean speed calculated at step C with the mean steering quantity calculated at step D.

The mean lateral acceleration represents the degree of operation of the steering wheel related to the car speed at the present state, in other words, the mean lateral acceleration represents the steering feeling when the driver rotates the steering wheel.

Figure 4:
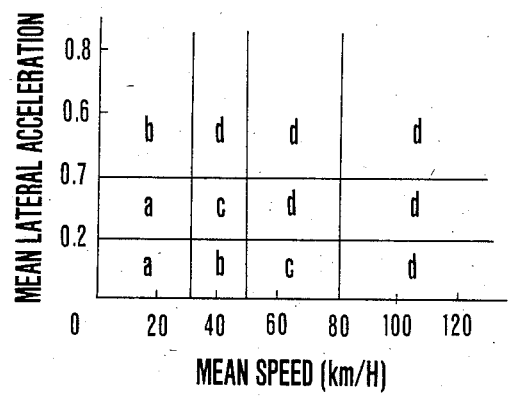
FIG. 4 is a chart showing a combination of optimum number of revolution characteristics of the oil pump which are selected when a mean car speed and a mean lateral acceleration are determined.

At step F, the number of revolutions characteristic of the oil pump suitable for the running condition at that time is read out. The number of revolution characteristic of the oil pump determines the number of revolutions of the oil pump suitable for the car speed and these characteristics differ as shown in FIGS. 3a-3d according to the running conditions. In FIGS. 3a-3d, the abscissa represents the car speed at given running points and the ordinate the number of revolutions of the oil pump. For example, while running a city area in which road width is narrow and running in only one direction is permitted, since the car must turn many times the oil pump 16 is required to continue its operation up to speed of about 35 Km/H which is the permissible as the maximum speed in the city area. As a consequence, under this condition a characteristic as shown in FIG. 3a is suitable. When running along roads outside of the city area, the car speed is high so that a characteristic as shown in FIG. 3b is suitable. When running down along a mountain road, the car speed increases over that when the car runs along a common road, but as it is necessary to operate the power steering device up to a high car speed, a characteristic as shown in FIG. 3c is suitable. On the other hand, when the car runs at a high speed on a high speed road, the power steering is not necessary so that the oil pump 16 is stopped. But in order to smoothly stop the power steering when the speed is changed from a medium speed to a high speed, a characteristic in which the minimum number of revolutions is small just prior to the stop of the oil pump as shown in FIG. 3d is desired. Thus by prestoring characteristics suitable for respective running conditions in the memory device and then reading out the stored characteristics at step F in accordance with the mean lateral acceleration and the mean car speed it is possible to always read out characteristics commensurate with the running conditions. While the running condition is determined by the mean car speed and the mean lateral acceleration, the relation between these variables and the number of revolution characteristic of the oil pump can be made as shown in FIG. 4, for example. In FIG. 4, a through d show the characteristics shown in FIGS. 3a-3d respectively.

After the number of revolutions characteristic of the oil pump suitable for a given running condition has been read out from the memory device at step F, at step G a number of revolutions signal of the oil pump for the car running speed is read out in accordance with the read out number of revolutions characteristic of the oil pump. At step H, the read out number of revolutions signal of the oil pump is sent to the oil pump from the control apparatus 10 so that the number of revolutions of the oil pump 16 is controlled to an optimum value adequate for the running condition.

When the result of judgement at step B is NO, that is a not running state is judged, at step I a judgement is made as to whether the steering is made or not based on the steering signal taken in at step A. When the result of judgement at step I is YES, that is when a steering judgement is judged, at step J the control apparatus 10 sends an optimum number of revolutions signal, for example the maximum number of revolution of the pump, to the oil pump. When the result of judgement at step I is NO, it is necessary whether the steering is not made at all, or the steering is momentarily stopped during running or the steering has not been made from the first time. In the first case, since the power steering is made, at step K a state in which there is a load signal is detected so as to continue sending out the optimum number of revolutions signal of the oil pump. In the last case, a condition in which there is no load signal is detected and steps A, B, I and K are repeated until the next state change occurs.

Although at step J, the number of revolutions of the oil pump when the car does not run was assumed to the maximum number of revolutions because the load as seen from the steering wheel is the largest, it should be noted that the number of revolutions is not necessarily a maximum value because the driver's desire differs.

Figure 5:
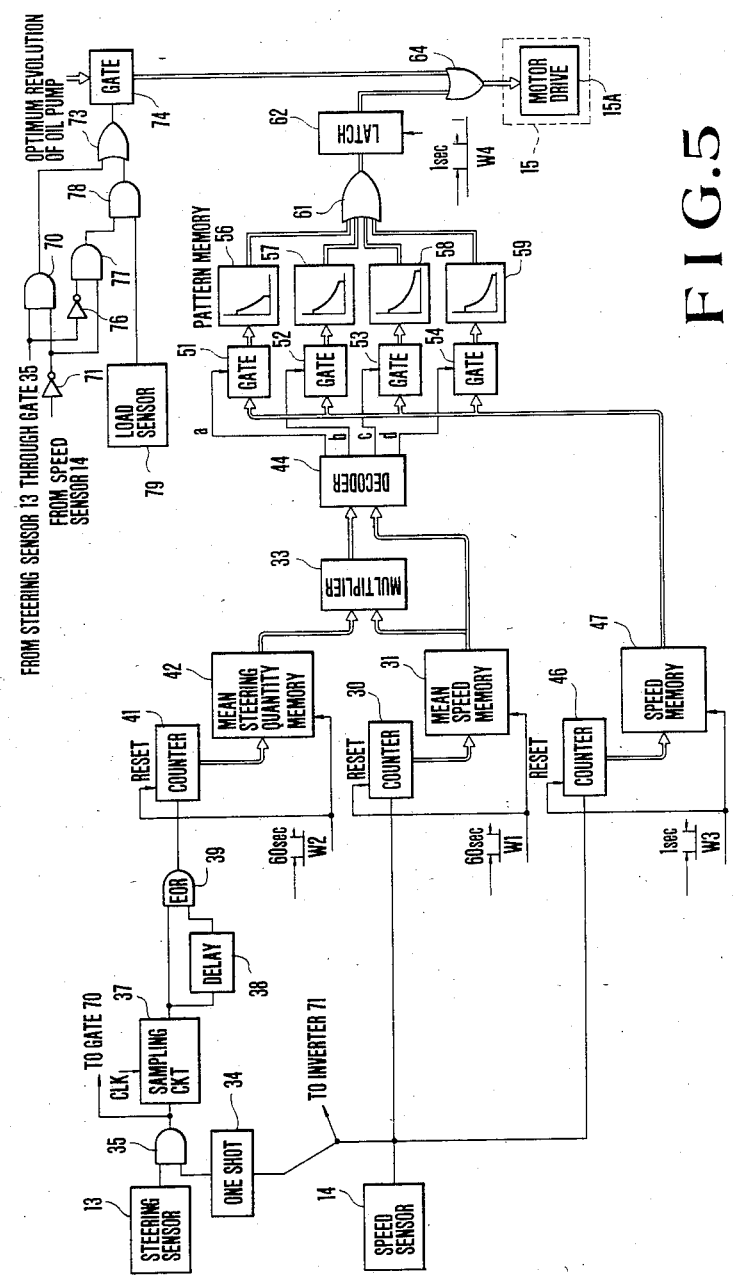
FIG. 5 is a block diagram showing the basic construction of the power steering control apparatus according to this invention.

FIG. 5 shows the detail of one example of the power steering control apparatus that operates in a manner described above. In FIG. 5, the car signal pulse produced by the car speed sensor 14 is applied to a counter 30 to be sequentially counted. The counter 30 counts the number of the outputs of the car speed sensor 14 for a definite interval and its count is stored in a mean car speed memory device 31 as the mean car speed signal. Each time a write pule W1 given at an interval of 60 seconds, for example, is applied, the mean car speed memory device 31 takes in the output of the counter 30 which also receives the write pulse to be reset immediately after the memory device 31 has taken in the content of the counter 30 and then counts the number of pulses sent from the car speed sensor 14. The content of the mean car speed memory device 31 is sent to a multiplier 33 and a decoder 44 as one input as will be described later in detail.

The steering signal produced by the steering sensor 13 which represents the quantity of steering and having a sign corresponding to the direction of rotation of the steering wheel is sent to a sampling circuit 37 via an AND gate circuit 35. This AND gate circuit 35 is enabled when the output of the car speed sensor 14 is applied to its other input via a one shot circuit 34 to produce the output of the steering sensor 13. In accordance with a clock pulse CLK acting as a sampling pulse, the sampling circuit 37 forms a signal having a definite sign irrespective of the sign of the supplied steering signal. The clock pulse CLK has a frequency of 800 KHz for example. The output of the sampling circuit 38 is applied directly to one input of an exclusive OR gate circuit 39 and to the other input thereof via a delay circuit 38. The delay circuit 38 functions to delay the input signal by one period of the sample pulse, 1.5 microsec. for example. Consequently, the exclusive OR gate circuit 39 produces an output when a sampled steering signal sequentially sent out from the sampling circuit 37 does not coincide with an immediately preceding sampled steering signal. As a consequence, the output of the exclusive OR gate circuit 39 represents whether steering is made or not, and these outputs are sent to a counter 41 to be counted sequentially. The counter 41 counts the number of the outputs of the steering sensor 13 for a definite time and the count thereof is stored in a mean steering quantity memory device 42 as the mean steering signal. Each time a write pulse W2 is given to the mean steering quantity memory device 42 in synchronism with the write pulse W1 having an interval of 60 seconds, for example, and applied to the mean car speed memory device 31, the mean steering quantity memory device 42 takes in the output of the counter 41 which is reset immediately after the memory device 41 has taken in the content of the counter 41 and then starts to count the number of the pulses given from the steering quantity sensor 13. The output of the mean steering quantity memory device 42 is sent to a multiplier 33 in which it is multiplied with the output from the mean car speed memory device 31. The output of the multiplier 33 represents the mean lateral acceleration and is sent to a decoder 44.

The decoder 44 determines the place at which the car runs, that is the running condition in accordance with the table shown in FIG. 4 and based on the mean lateral acceleration signal from the multiplier 33 and the mean car speed signal from the mean car speed memory device 31. According to the result of this determination, an output is produced on either one of four output lines to enable either one of four corresponding gate circuits 51-54 which are supplied with the car speed signal from the car speed memory device 47. Accordingly, the selected one of the gate circuits 51-54 supplies the output of the car speed memory device 47, that is the car speed signal to either one of four corresponding pattern memory devices 56-59 as an address signal. Where the gate circuit 51 is selected, for example, the car speed signal is applied to the pattern memory device 56 as the address signal.

The output of the car speed sensor 14 is sent to a counter 46 to count the car speed. This counter 46 counts the number of the outputs of the car speed sensor 14 for a definite time and its output is stored in a car speed memory device 47 as a car speed signal. The car speed memory device 47 takes in the output of the counter 41 each time it is supplied with a write pulse W3 which is in synchronism with the write pulses W1 and W2 utilized to write memory devices 31 and 42 but having a shorter period than these write pulses, for example 1 second. Then upon reception of the write pulse W3, the counter 46 would be immediately reset when the memory device 47 takes in the content of the counter 46 and begin to count the number of the car speed signal pulses sent from the car speed sensor 14. The content of the car speed memory device 47 is sent to gate circuits 51-54 to be described later.

Consequently, the pattern memory devices 56-59 send the number of revolutions signals of the pump (in digital form) stord in designated addresses to a latch register 62 via an OR gate circuit 61. The latch register 62 stores the outputs of the pattern memory devices 56-59 sent through the OR gate circuit 61 in accordance with a latch pulse having a period of 1 second and synchronous with the write pulses W1-W3. The signal latched by the latch register 62 represents the number of revolutions of the pump related to the running speed while the car is running, and this signal is sent to a motor drive circuit 15A via OR gate circuit 64 for controlling the motor 15 so that it drives the pump 16 at a number of revolutions described above.

The output of the steering sensor 13 is also sent to one input of an AND gate circuit 70 via AND gate circuit 35, the other input of the AND gate circuit 70 being supplied with the output of the car speed sensor 14 via an inverter 71. Thus, the AND gate circuit 70 produces an output when the steering sensor 13 produces an output as a result of the operation of the steering wheel 12 even though the car does not run, and the output of the AND gate circuit 70 is sent to a gate circuit 74 via an OR gate circuit 73. As a consequence, during the car stop, an optimum number of revolutions signal of the pump (for example, a number of revolutions signal representing the highest pump speed) is sent to motor drive circuit 15A via an OR gate circuit 64. As a consequence, the motor 15 is controlled to drive the pump at an optimum number of revolutions.

The output of the AND gate circuit 35 is also supplied to one input of an AND gate circuit 77 via an inverter 76, the other input of the AND gate circuit 77 being supplied with the output of an inverter 71 with the result that the AND gate circuit 77 sends its output to one input of an AND gate circuit 78 when the car does not run and the steering wheel is not rotated. The AND gate circuit 78 is enabled when it receives the output of the AND gate circuit 77 and the output of the load sensor 79 to send its output to the gate circuit 74 via OR gate circuit 73. As a consequence, an optimum pump revolution number signal would be sent to the motor drive circuit 15A through the OR gate circuit 64. Thus, this state represents the fact that the pump load has become larger than a predetermined value even though the car is not running and the steering is not effected. Accordingly, the motor drive circuit 15A controls the pump 16 such that it is driven at a number of revolutions (for example, at the highest speed) commensurate with the pump load.

Figure 6:
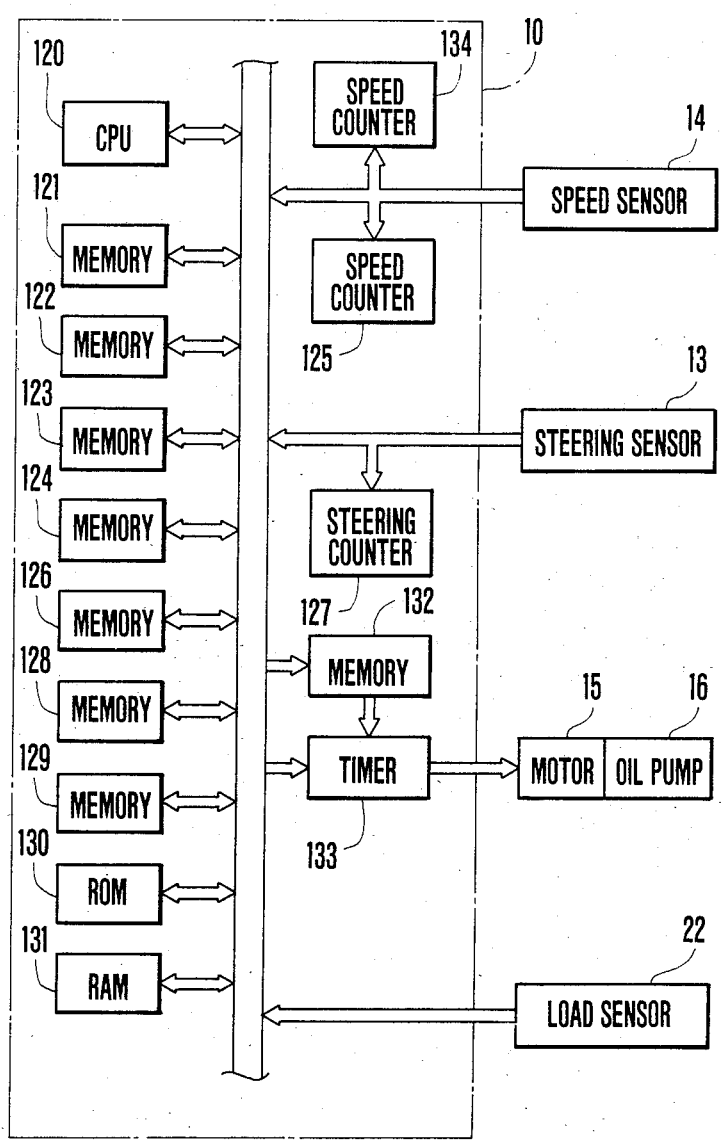
FIG. 6 is a block diagram showing a case wherein the control apparatus is constituted by a microcomputer.
Figure 7:
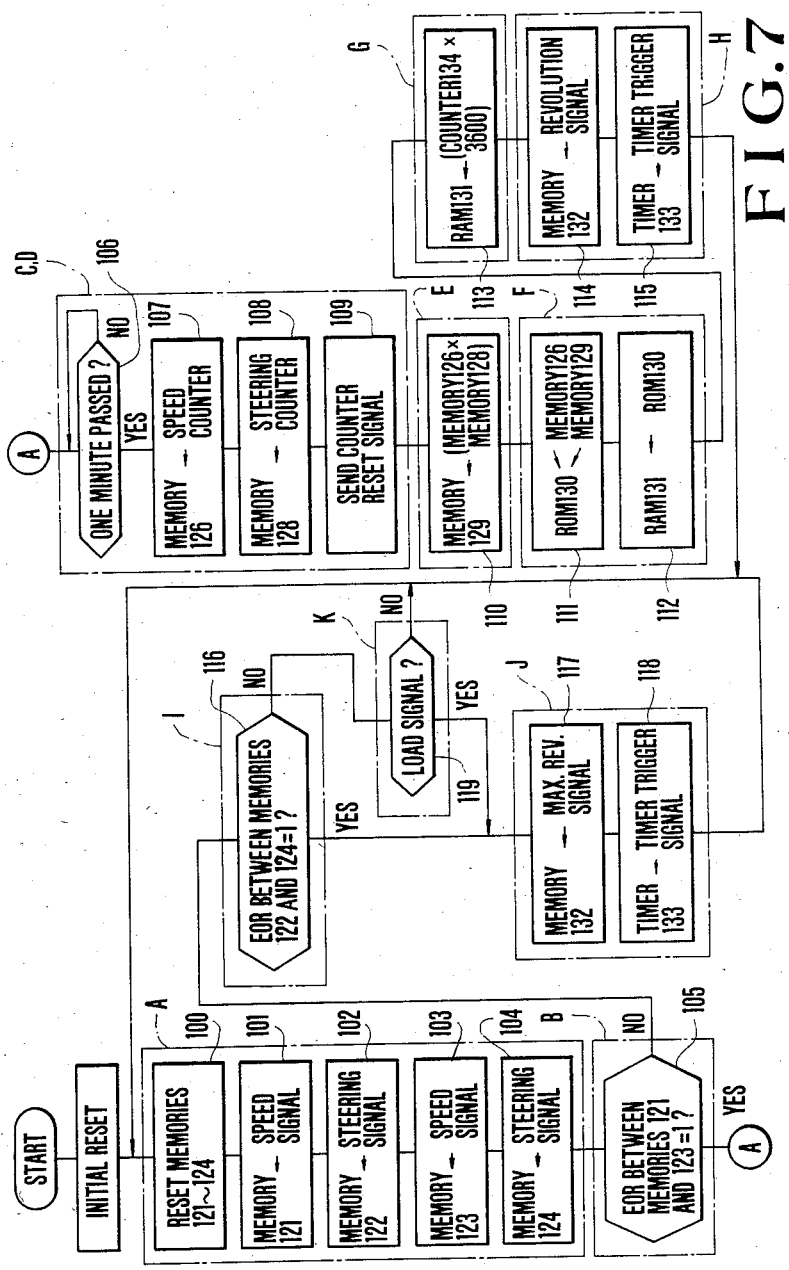
FIG. 7 is a flow chart adapted to explain the operation of the control apparatus shown in FIG. 6.

FIG. 6 is a block diagram showing one embodiment of the power steering control apparatus of this invention which is constituted by a microcomputer and its operation is shown by a flow chart shown in FIG. 7.

Figure 2:
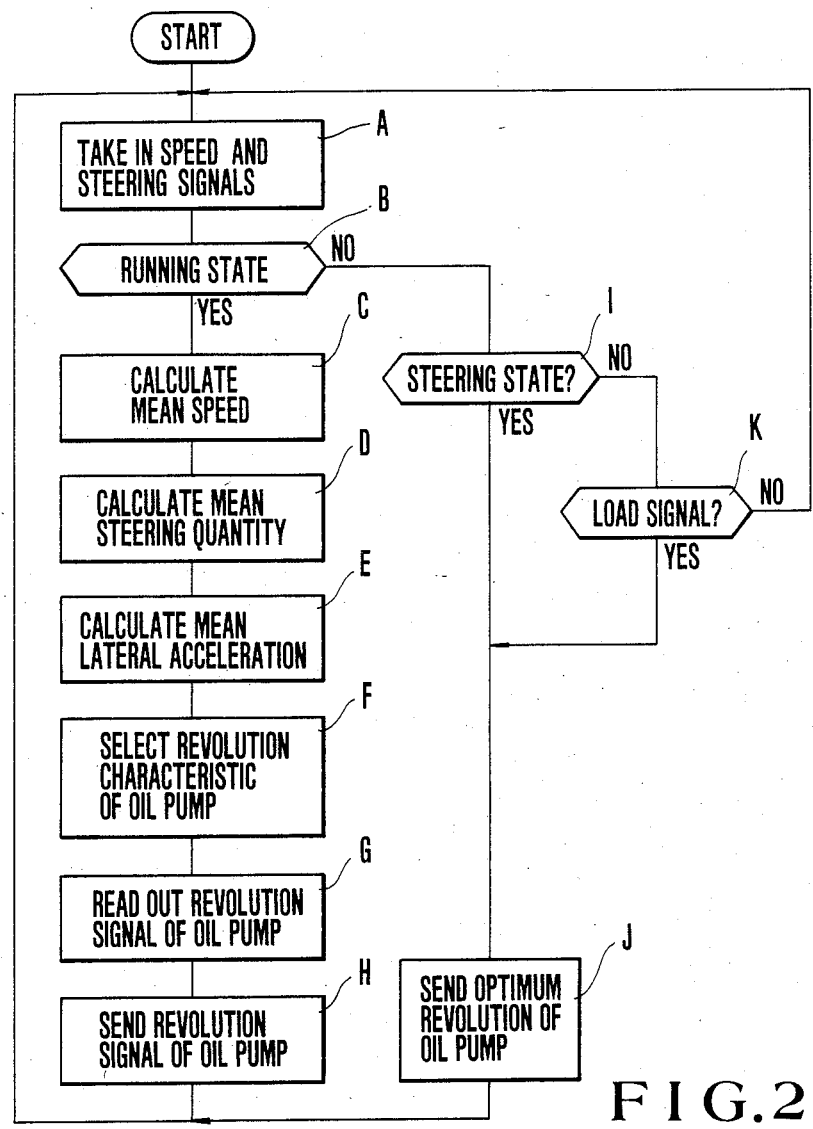
FIG. 2 is a flow chart showing the operation of the control apparatus shown in FIG. 1.

The flow chart shown in FIG. 7 shows the detail of the steps A through K shown in FIG. 2 and the steps A-K bounded by dot and dash lines correspond to the steps A-K shown in FIG. 2. After an initial reset has been made, at step 100, a CPU 120 shown in FIG. 6 resets memory devices 121-124. Then at step 101, a car speed signal is stored in a memory device 121, at step 102, a steering signal is stored in a memory device 122, at step 103 a car speed signal is stored in a memory device 123 and at step 104 a steering signal is stored in a memory device 124. As shown in FIG. 8, the levels of the car speed signal and the steering signal become stable after a time delay Δt. Accordingly the timings are set such that the steps 101, 102, 103 and 104 are executed at times t1, t2, t3 and t4 respectively shown in FIG. 8, so that the levels become different at the first and last steps when the level changes. The levels of the car speed signal and the steering signal become "0" or "1" when the car is not running and the steering wheel is not rotated. For this reason, the steps B and I should be set such that the judgement of the running state or the steering state should be made according to the variation in the signal level. To this end, the operating timings of the respective steps should be determined such that the variation states of the input signals should be accurately determined.

As shown by step 105, step B is constructed to supervise the exclusive logic sum (EOR) of the memory devices 121 and 123. When the EOR output of the signal levels stored in the memory devices 121 and 123 is "1" the signal levels stored in the memory devices 121 and 123 are different which means a state in which the input signal is varying. At this time, a running state is judged and steps C and D are executed as shown by steps 106 through 109. At step 106 whether a unit time of one minute has elapsed or not is judged. When one minute has elapsed, at step 107 the count of the car speed counter 125 is stored in a memory device 126, and at step 108, the count of the steering counter 27 is stored in a memory device 128. At step 109 a counter reset signal is sent out so that counters 125 and 127 start to count the numbers of the car speed signal and the steering signal. The resetting of the counters 125 and 127 at the time of starting the operation is effected by an initial resetting. In this manner, by taking one minute as a unit time the mean car speed and the mean steering quantity in one minute can be obtained by counting the numbers of the car speed signals and the steering signals in the unit time.

As shown by step 110, the calculation of the mean lateral acceleration at step B can be made by multiplying the mean car speed stored in the memory device 126 with the mean steering quantity stored in a memory device 128 and then storing the product in a memory device 129. As shown by step 111, at step F, the mean car speed stored in the memory device 126 and the mean lateral acceleration stored in the memory device 128 are supplied to a ROM 130 written with several types of the number of revolutions characteristics of the oil pump to read out the number of revolutions characteristics of the oil pump for storing the read out characteristics in a RAM 131. As shown by step 113, step G is used to calculate the car speed in Km/hour. This calculation is made in the following manner. More particularly, a counter 134 counts the number of the car speed signals supplied from the speed meter 14 while updating its count at each one second. Thus, by multiplying the count of the counter 134 by 3600 the car speed in Km/hour can be calculated and by supplying the product to RAM 131 the number of revolutions of the oil pump can be read out. As shown by step 114, at step H, the number of revolutions signal read out from RAM 131 is stored in a memory device 132 so as to send a time drive signal to a timer 133 as shown by step 115. For this reason, the number of revolutions signal stored in the memory device 132 is supplied to the motor 15 for the operating time of the timer 133 so that the oil pump 16 rotates in accordance with the number of revolutions signal. The operating time of the timer 133 is set to a time slightly longer than one second.

The control apparatus takes in new car speed signal and steering signal, and in the steps following step 106 new data are used at each one minute, while in the steps following step 113 new data are used at each one minute so that a rotational number characteristic of the oil pump suitable for the running condition at that time would be selected. Consequently, the number of revolutions of the oil pump 16 is reset at each one second and the selected number of revolutions is controlled to that most suitable for the running condition.

When the result of judgement executed at step B is NO, that is a not running condition, at step I a judgement is made as to whether the state is the steering state or not. This operation is similar to that executed at step B. More particularly, as shown by step 116, an exclusive logic sum of the contents of memory devices 122 and 124 is calculated so as to judge a steering state when the steering signal levels at different times are not equal, whereas a nonsteering state when the steering signal levels are the same.

Step J operates in the same manner as step H. More particularly, at step 117 the maximum number of revolutions signal is stored in a memory device 132, while at step 118, a timer drive signal is sent to a timer 133. As a consequence, the maximum number of rotation signal is supplied to motor 15 and the oil pump 16 for the operating time of the timer 133. After sending out the timer drive signal at step 118, the control apparatus returns to step 100 so that this operation is repeated so long as the steering state persists to supply the maximum number of revolutions signal to motor 15 and oil pump 16.

Since step K is provided only for the purpose of judging whether a load signal is present or not, it is only necessary to supervise the output of the load sensor 22 at step 119.

As above described according to the method and apparatus for controlling power steering, the number of revolutions of the oil pump is controlled in accordance with a number of revolutions characteristic of the oil pump most suitable for a given running condition so that under any running condition, the steering can be made smoothly.

It should be understood that the invention is not limited to the specific embodiments described above and that many changes and modifications can be made without departing the true spirit and scope of the invention. For example, instead of making the interval of operation of the mean car speed memory device 31 and the mean steering quantity memory device to be 60 seconds, this interval may be made to about 30 seconds. This interval or period varies depending upon such factors as the clock pulse frequency, the required follow up characteristic or the like. The same is true for the write pulse of the car speed memory device and the latch pulse of the latch register 62. If desired, the period can be changed to other values.

Although FIG. 5 shows only the basic construction necessary to understand the invention, when designing a practical circuit many other circuit elements are added.

The number of revolutions characteristic of the oil pump is not limited to the four patterns shown in FIGS. 3a-3d, but it may be two or five. Thus the number of characteristics can be increased or decreased in accordance with the desired smooth steering characteristic.

What is claimed is:

1. A method of controlling power steering apparatus wherein a number of revolutions of an oil pump is controlled to control power steering, the method comprising the steps of:

calculating a mean car speed in accordance with a car speed signal;

calculating a means steering quantity in accordance with a steering signal representing a steering quantity;

calculating a mean lateral acceleration based on said mean car speed and said mean steering quantity;

preparing a plurality of types of number of revolutions characteristics of the oil pump respectively showing a relation between car speed and the number of revolutions of said oil pump when the car runs;

selecting one of said plurality of number of revolutions characteristics in accordance with said mean lateral acceleration and said mean car speed, and controlling said oil pump in accordance with said selected number of revolutions characteristic and the car speed signal to cause the oil pump to rotate at a number of revolutions suitable for the car speed as the car runs.

2. Power steering control apparatus utilizing an oil pump comprising:

a car speed sensor producing a car speed signal;

a sensor producing a steering signal representing a steering quantity of a steering wheel of a car;

a mean car speed calculating circuit calculating a mean car speed based on said car speed signal;

a mean steering quantity calculating circuit calculating a mean steering quantity based on said steering signal;

a mean lateral acceleration calculating circuit calculating a mean lateral acceleration based on said mean car speed and said mean steering quantity thus calculated;

a car speed calculating circuit calculating a car speed in accordance with said car speed signal;

pattern memory means storing a plurality of number of revolutions characteristics of the oil pump corresponding to different patterns showing relations between the car speed and the number of revolutions of said oil pump as the car runs;

a selection circuit selecting one of said number of revolutions characteristics in accordance with said mean lateral acceleration and said mean car speed;

means for deriving out a number of revolutions signal of said oil pump corresponding to said car speed in accordance with an output of said car speed sensor; and control means controlling rotation of said oil pump in accordance with said derived out number of revolutions signal of said oil pump.

3. The power steering control apparatus according to claim 2 which further comprises a detection circuit detecting that said car speed sensor does not produce an output and that said steering sensor produces an output, and an AND gate circuit providing an optimum number of revolutions signal to said control apparatus in accordance with the output of said detection circuit.

4. The power steering control apparatus according to claim 3 which further comprises another detection circuit detecting the fact that said car speed sensor and said steering sensor do not produce any output, a load sensor detecting a load of said oil pump exceeding a predetermined value, and another gate circuit sending an output of said load sensor to said first mentioned gate circuit in accordance with the output of said another detection circuit.

* * * * *